United States Patent [19]

Engels et al.

[11] Patent Number: 4,668,659
[45] Date of Patent: May 26, 1987

[54] EXHAUST GAS CATALYST SUPPORT OF INORGANIC MOLDING COMPOSITIONS AND PROCESS FOR PRODUCING THE SUPPORT

[75] Inventors: Hans-Werner Engels, Troisdorf; Karlheinz Neuschaeffer, Leichlingen; Paul Spielau, Troisdorf-Eschmar, all of Fed. Rep. of Germany

[73] Assignee: Dynamit Nobel Aktiengesellschaft, Troisdorf, Fed. Rep. of Germany

[21] Appl. No.: 848,494

[22] Filed: Apr. 7, 1986

[30] Foreign Application Priority Data

Apr. 6, 1985 [DE] Fed. Rep. of Germany ....... 3512586

[51] Int. Cl.$^4$ ............................................. B01J 35/04
[52] U.S. Cl. .................................. 502/439; 502/527; 423/213.5
[58] Field of Search ............................. 502/527, 439; 423/213.5

[56] References Cited

U.S. PATENT DOCUMENTS 3,741,725  6/1973  Graham ........................... 423/213.7
3,931,050  1/1976  Asano et al. .................... 502/333 X
4,189,404  2/1980  Keith et al. ..................... 502/527 X Primary Examiner—W. J. Shine
Attorney, Agent, or Firm—Antonelli, Terry & Wands

[57] ABSTRACT

An exhaust gas catalyst support having hollow channels lined with $\gamma$-$Al_2O_3$ is formed by preparing an inorganic molding composition which actively hardens at 60°–120° C.; the molding composition containing an alkali silicate solution and a solid component reactive with the alkali silicate solution, which component can consist of an oxide mixture with contents of amorphous $SiO_2$ and aluminum oxide and/or electrostatic precipitator ash from high-temperature coal-burning power plants and/or calcined ground bauxite and/or metakaolin; the hollow channels contained within the exhaust gas catalyst support are formed by reaction of aluminum rods or wires in the alkali silicate solution, with the simultaneous precipitation of alumina hydrate. In a subsequent heating step, the $\gamma$-aluminum oxide lining is formed from the alumina hydrate, the lining serving for anchoring and fixation of a catalyst metal within the catalyst support.

8 Claims, 2 Drawing Figures

EXHAUST GAS CATALYST SUPPORT OF INORGANIC MOLDING COMPOSITIONS AND PROCESS FOR PRODUCING THE SUPPORT

This invention relates to an inorganic support for catalysts used to treat exhaust gas in, for example, automotive vehicles, or for gas cleaning of industrial installations and/or power plants. Generally such supports have hollow channels therein wherein the catalyst materials are applied and consist of molded ceramic articles which are baked, and thereby hardened, at the high temperatures required for ceramic materials and to which a support material of γ-aluminum oxide must be applied in the channels, for the purpose of anchoring the catalyst made up of preferably finely divided catalyst metals.

On account of the method for manufacturing a ceramic as well as the diameter determined by the required hollow channels and the γ-aluminum oxide provided therein, the production of such catalyst supports for exhaust gas purification and the like is expensive.

It is proposed, according to this invention, to produce the molded body of the inorganic catalyst support from an inorganic pourable molding composition that hardens at low temperatures of at most 120° C. This molding composition comprises a solid inorganic reactive component and a liquid alkali silicate solution and is capable of forming the required hollow channels in a simplified way and of producing the lining of γ-aluminum oxide within the hollow channels in a novel manner by the use of a plurality of aluminum metal inserts. The lined hollow channels are made possibly by the use of the alkaline alkali silicate solution as a component of the pourable molding composition which reacts with the aluminum inserts to form deposits or precipitates of alumina hydrate. In a subsequent operation, the alumina hydrates initially formed are converted into γ-aluminum oxide as a firmly adhering lining of the hollow channels, on which catalyst metals can be firmly anchored.

More particularly, this invention is directed to an exhaust gas catalyst support comprised of an inorganic molded part or body, with hollow channels formed therein, the channels having linings of γ-aluminum oxide. The molded part is produced from a pourable molding composition by hardening at 60°-120° C., to effect reaction of (a) an oxide mixture with contents of amorphous $SiO_2$ and aluminum oxide and/or (b) electrostatic precipitator ash from hightemperature coal-burning power plants and/or (c) calcined ground bauxite and/or metakaolin in amounts of 0.5-4.0 parts by weight of the finely divided reactive components (a) through (c) per one part by weight of an alkali silicate solution with contents of 1.2- to 2.5 moles of dissolved $SiO_2$ per mole of $K_2O$ or $Na_2O$ as well as optionally finely divided fillers and channel-precursor zones are formed within the molded part with deposits of alumina hydrate by placing or suspending aluminum wires, aluminum rods or the like aluminum inserts, in the still fluid molding composition to promote reaction of the aluminum with the alkali of the alkali silicate solution during the hardening procedure. Thereafter, the deposits are converted into γ-aluminum oxide on the surfaces of hollow channels by heating the molded part to temperatures of up to 850° C. and, if necessary, removing any remaining unreacted portions of the aluminum inserts from the molded part.

A further aspect of the invention is a process for the production of the exhaust gas catalyst support which comprises forming a pourable inorganic molding composition containing (a) an oxide mixture of amorphous $SiO_2$ and aluminum oxide and/or (b) electrostatic precipitator ash from high-temperature coal-burning power plants and/or (c) calcined ground bauxite and/or metakaolin, as finely divided particles in amounts of 0.5-4.0 parts by weight of components (a) through (c) per one part by weight of an alkali silicate solution containing 1.2 to 2.5 moles of dissolved $SiO_2$ per mole of $K_2O$ or $Na_2O$ and optionally finely divided fillers; introducing the composition pouring, pressing and/or extruding into a mold containing a plurality of aluminum wires or aluminum rods arranged in a predetermined pattern corresponding to the desired pattern of the hollow channels; hardening the molding composition at temperatures of 60°-120° C. within said mold, hollow channels with a lining of alumina hydrate being formed in place of the aluminum wires or rods by reaction of the alkali of the alkali silicate solution; and thereafter converting the alumina hydrate on the surface of the hollow channels to γ-aluminum oxide by heating the molded support to 600°-850° C.

According to the invention, the molded parts forming the exhaust gas catalyst supports are produced from a pourable inorganic molding composition which is capable of hardening in a lithogenous fashion at low temperatures of 60°-120° C., preferably at temperatures of 60°-98° C.

Only selected, special-type inorganic, finely divided solids are capable of hardening in a stone-forming fashion with the alkaline alkali silicate solution. In particular, it has been found that only a few materials meet the prerequisite of being insoluble in the alkali silicate solution, on the one hand, and of solidifying to form solid bodies without the supply of external or, in some cases, with supply of heat at low temperatures of at most 120° C., on the other hand; which solid bodies are dimensionally stable, withstand a subsequent heating process, and exhibit a high breaking strength and flexural stress at break of at least 10 $N/mm^2$, as well as a high compressive strength and a high hardness according to the Mohs scale.

Surprisingly, it is possible, on the one hand, to produce exhaust gas catalyst supports from alkaline reacting pourable molding compositions without the alkaline components impairing the effectiveness of the catalysts. On the other hand, it is surprising that a substantially simplified manufacture of the cavities for the passage of the exhaust gases is possible and, at the same time, a substantially simplified lining of these cavities with γ-$Al_2O_3$ for anchoring the catalysts can be achieved.

Metakaolin, as a solid reactive component (c) of the molding composition, is obtained from natural kaolin by heating at high temperatures and is known from European Pat. No. 0026 687 to be a component of molded parts that can serve for the production of artwork.

The oxide mixture (a) with contents of amorphous $SiO_2$ and aluminum oxide is anhydrous and is formed in high-temperature processes as finely divided dust by cooling from the vapor or gaseous phase in the manufacture of industrial melting products, such as, in particular, corundum or mullite from bauxite wherein the oxide mixture, with fluctuating composition, does not correspond to the final product, corundum. In the oxide mixture, depending on the type of melting process and the course of the melting step, varying proportions of components can be contained, i.e. from 7 to 75% by weight of $SiO_2$ and 12 to 87% by weight of $Al_2O_3$, besides additional ingredients which can be, for example, iron oxides or small proportions of fluorides, $P_2O_5$ or $ZrO_2$. The $SiO_2$ is present in X-ray amorphous form; whereas the $Al_2O_3$ is at least in part crystalline; in this connection, $\alpha$-$Al_2O_3$ (corundum) and, in particular, the alkali-containing $\beta$-$Al_2O_3$ were detected.

Electrostatic precipitator ash (b) is produced as a dust-like deposit in the electrostatic filters of high-temperature coal-burning power plants with combustion temperatures of 1,600°–1,700° C. Only this electrostatic precipitator ash, formed at the aforementioned temperatures, is usable in the molding compositions as the reactive ingredient, whereas deposits from power plant at lower chamber temperature are useless. Electrostatic precipitator ash is a vitreous-amorphous material and contains 45-55% by wight of vitreous $SiO_2$, 25-35% by weight of $Al_2O_3$, and smaller proportions of $Fe_2O_3$. Analysis of most samples yields 48-52% by weight of $SiO_2$, 25-30% by weight $Al_2O_3$, and 8-11% by weight of $Fe_2O_3$. The grain size is below 10 $\mu$m to an extent of 65%, below 50 $\mu$m to an extent of 80%, and below 60 $\beta$m to an extent of 90%.

Calcined bauxite (c) is produced from ground or crushed bauxite by a calcining process at high temperatures of about 400° to 1000° C. and is available as a raw material of the aluminum industry. Natural bauxite is a mixture of several aluminum silicate minerals with a composition, varying on its site of origin, of 50 to 70% by weight of $Al_2O_3$, 0 to 25% by weight of $Fe_2O_3$, 12 to 40% by weight of water, 2 to 30% by weight of $SiO_2$ and smaller proportions of other materials.

Suitable alkali silicate solutions are so-called "water glass solutions" with the aforementioned molar ratios, those with $K_2O$ being preferred over those with $Na_2O$; the alkali is to be present preferably in excess.

Preferably, 1.2–2.0 moles of $SiO_2$ per mole of $K_2O$ or $Na_2O$ are to be present. The alkali silicate solutions generally exhibit a water content of 28–45% by weight; in case of sodium silicate, this water content can also be up to 60% by weight, but the solutions lower in water content are preferred.

The alkali silicate solution which is preferred is that prepared by dissolving amorphous, disperse-pulverulent, aqueous silicic acid, in alkali hydroxides or in the aqueous solutions of the latter.

The molding compositions exhibit water contents of 20–65% by weight, based on the active lithogenous components, without considering the fillers; water contents of 26–58% by weight being preferred.

Fillers are preferably those showing elevated temperature stability and not being subject to troublesome changes during heating for production of $\gamma$-$Al_2O_3$.

Such fillers are, for example, talc, $SiO_2$, quartz, aluminum oxides, and MgO. However, also suitable fillers are the aforementioned reactive components of the molding composition, exceeding the stated quantities and therefore not actively entering the reaction. The content of fillers ranges from 10 to 50%.

A novel route is pursued for the provision of the hollow channels in the catalyst support; these channels must be provided in correspondence with the maximum exhaust gas quantity in a corresponding number and with a suitable diameter.

Heretofore, the channels had to be kept vacant during the shaping of the support with the use of ceramic catalyst supports, by an appropriate configuration of the molds; this is difficult and expensive especially in case of a large number of channels each having a small diameter. Furthermore, aluminum hydrate or alumina hydrate had to be introduced into these channels in a separate working step in order to anchor the catalyst metals after conversion to $\gamma$-$Al_2O_3$.

A simple route is taken in accordance with this invention, pursuant to which aluminum rods or wires are already arranged in a predetermined pattern during the pouring of the molding compositions into the mold, and react with the alkali of the molding composition under formation of hydrogen and alumina hydrate and form the channels in this way. It is advantageous that enlarged channels are produced as compared with the diameter of the wires, these channels having a large internal surface area. The locating of the channels, and thus of the Al wires, varies in dependence on the type of catalyst supports; a parallel arrangement of the hollow channels is popular, as well as a radial arrangement, starting from a central inlet of a larger diameter.

The process of forming the catalyst support can be enhanced by application of an electric DC voltage. For this purpose, it is advantageous for holding the rods and wires, respectively, to provide a portion of the mold wall, for example in case of a cylindrical structure of the catalyst the end faces of the cylinder shaped mold, with, for example, perforated disks wherein the aluminum rods are held. The head ends of the rods can then be connected, if necessary, with a current source in a simple way. In accordance with the invention, the rods or wires can be entirely converted into the alumina hydrate, or the residual cores of the rods can be removed. The resultant hydrogen is removed by suction applied to the mold.

Consequently, according to the invention, a close interrelationship is provided of the peculiarities of the alkaline molding composition and its hardening at only low temperatures into solid parts removable from a mold, and the reaction of the alkali content of the molding composition with the aluminum of the rods for the formation of the hollow channels whereby the manufacture of exhaust gas catalyst support becomes substantially simplified and considerably more economical.

The temperatures required during hardening are produced, in part, by the heat of reaction during the reaction of the solid reactants with the alkali silicate solution, but these temperatures can be produced by external heating or by electric resistance heating and/or by the heat of reaction of aluminum with the alkali metalhydroxide.

The hardening time of the molding compositions into molded parts is brief and generally is 20–60, preferably 20–40 minutes.

Production of the $\gamma$-aluminum oxide requires a heating step to conventional temperatures predetermined by the origination temperature of this aluminum oxide modification and range at most from 850° to 880° C., and, in general, from 600° to 850° C.

A special advantage is achieved by the firm inclusion of the $\gamma$-aluminum oxide by formation of the corresponding alumina hydrate during the hardening reaction.

During hardening, the water content of the molding composition is initially essentially preserved. This water content can be suitably eliminated by storing the produced molded parts in the open air, which is a simple procedure, but removal by heating to temperatures of above 120° C., or removal during the heating step while forming the γ-aluminum oxide is likewise possible.

Heating to 600°-850° C. serves exclusively for formation of γ-Al$_2$O$_3$, but not for hardening of the molded parts, which parts already exhibit after hardening at temperatures of at most 120° C. the required strength on the order of the strength of ceramic materials, this strength being obtained, however, in case of ceramic materials only by a baking step; whereas the present molding compositions according to this invention comprise at least one of the reactive solid components (a) through (c) permitting the obtention of the required strength by means of lithogenous chemical reactions with the alkali silicate solution.

BRIEF DESCRIPTION OF THE DRAWINGS

The accompanying drawing shows two embodiments of the exhaust gas catalyst supports according to this invention, wherein:

FIG. 1, a cross section of a catalyst support for exhaust gas treatment in vehicles, shows the typical, flattened-cylindrical shape with the circular cross sections of the substantially parallel channels 1 in the hardened molded body 2; reference numeral 4 representing the lining of γ-Al$_2$O$_3$.

FIG. 2 shows, in a perspective view, a catalyst support having hollow channels 1 terminating at the cylinder walls and starting from a central inlet 3, these channels being formed in the hardened molded body 2. Here again, reference numeral 4 designates the γ-Al$_2$O$_3$ lining.

EXAMPLE 1

Figure 1:
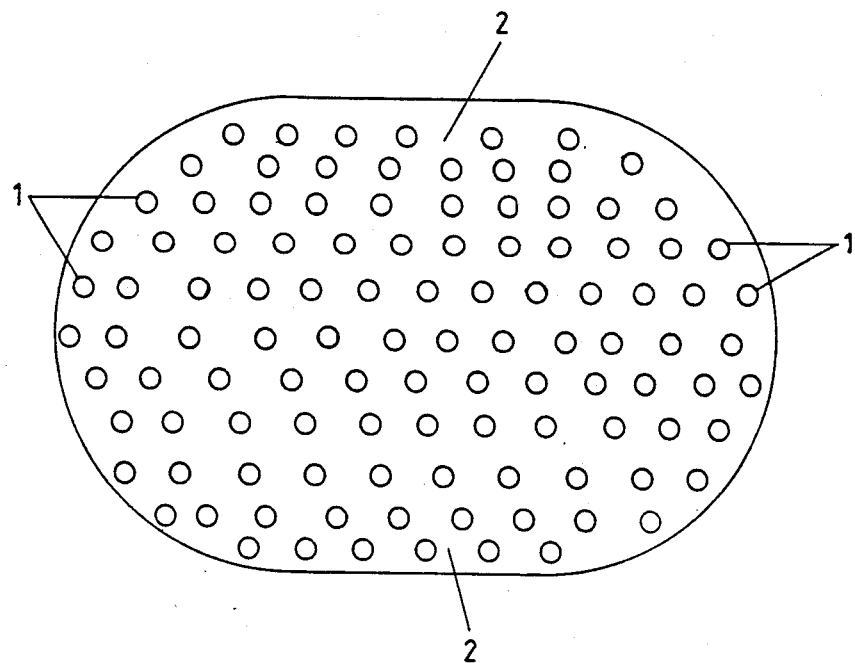
FIG. 1 is a cross sectional view of a cylindrical support having parallel channels.
Figure 2:
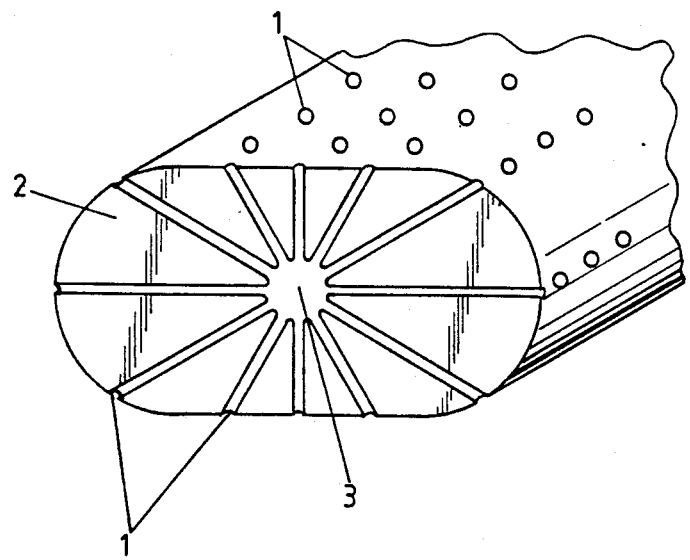
FIG. 2 is a perspective view of a catalyst support with radially arranged channels.

A pourable molding composition is produced by thorough intermixing of 100 g of potassium-alkaline silicic acid solution with a molar ratio of 1.5 SiO$_2$ to 1 K$_2$O, prepared from precipitated amorphous, disperse-pulverulent silicic acid with 50% by weight SiO$_2$ content, by dissolution in 50% by weight strength KOH; 100 g of oxide mixture containing amorphous SiO$_2$ and aluminum oxide, obtained as furnace filter dust in the melt processing of bauxite; and 100 g of calcined ground bauxite having a particle size of below 0.2 mm; this molding composition is filled into a confining vessel or mold containing aluminum wires arranged in parallel to one another, having a diameter of 0.2 mm and a mutual spacing of 0.6 cm, in vertically upright positioning. Hardening takes place at 85° C. within the mold and is finished within 60 minutes. During hardening, the surface of the wires is decomposed by the alkali present with formation of gaseous hydrogen and local hot spots. During unmolding, the residues of the wires are removed. A molded part or body is produced having a plurality of channels. The channels are greatly enlarged due to the gas formation and are coated with a layer of alumina hydrate. Several molded bodies for producing the catalyst supports are placed in a furnace heated to 700° C.; whereupon the furnace is heated to 750° C. whereby the alumina hydrate forms γ-Al$_2$O$_3$. The finished catalyst support can be provided, according to conventional methods, including impregnation, etc., with noble metal compounds which are fixed on the thus-produced γ-Al$_2$O$_3$.

EXAMPLE 2

A catalyst support is produced as in Example 1, with the exception that a fitting is attached to the perforated disk holding the aluminum wires in the confining mold, this fitting exhibiting respectively one electrical contact at the penetration points of the aluminum rods, an electric current being applied to these contacts.

During unmolding, it is unnecessary to remove residues of the aluminum wires. The hollow channels are more enlarged than in the molded part obtained according to Example 1.

EXAMPLE 3

Example 1 is repeated, but in this case there is used potassium-alkaline silicic acid solution having a molar ratio of 1.2 SiO$_2$ to 1 K$_2$O, in the same amount.

EXAMPLE 4

Example 1 is repeated, but using in place of the 100 g of calcined bauxite, 100 g of talc as a filler.

EXAMPLE 5

Example 1 is repeated, but there is used a sodium-alkaline silicic acid solution with a molar ratio of 1.3 SiO$_2$ to 1 Na$_2$O, prepared correspondingly by dissolving the precipitated silicic acid in 50% by weight strength NaOH.

We claim:

1. An inorganic catalyst support comprising an inorganic molded part, with hollow channels formed therein having linings of γ-aluminum oxide, the molded part having been produced from a pourable molding composition by hardening the composition at 60°-120° C. by reaction of the following components in the composition:
   (a) an oxide mixture with contents of amorphous SiO$_2$ and aluminum oxide and/or
   (b) electrostatic precipitator ash from high-temperature coal-burning power plants and/or
   (c) calcined ground bauxite and/or metakaolin in amounts of 0.5-4.0 parts by weight of at least one of components (a) through (c) per one part by weight of an alkali silicate solution with contents of 1.2 to 2.5 moles of dissolved SiO$_2$ per mole of K$_2$O or Na$_2$O as well as optionally finely divided fillers, by placing elongated aluminum inserts in the still un-hardened molding composition within the mold in a pattern corresponding to the desired pattern of the hollow channels by reaction of the aluminum with the alkali of the alkali silicate solution to form channel precursor zones with a deposit of alumina hydrate extending therethrough a molded part and by converting the deposit into γ-aluminum oxide on the surface of the resulting hollow channels by heating the molded part to temperatures of up to 850° C.

2. A process for the production of an inorganic catalyst support with hollow channels contained therein having a deposit of γ-aluminum oxide on the surface of the channels wherein an inorganic molding composition of (a) a oxide mixture with contents of amorphous SiO$_2$ and aluminum oxide and/or (b) electrostatic precipitator ash from high-temperature coal-burning power plants and/or (c) calcined ground bauxite and/or metakaolin, in amounts of 0.5–4.0 parts by weight of the at least one of components (a) through (c) per part by weight of an alkali silicate solution with contents of 1.2 to 2.5 moles of dissolved SiO$_2$ per mole of K$_2$O or Na$_2$O as well as optionally finely divided fillers is, in pourable form, introduced into a mold, the mold containing a plurality of parallel-arranged aluminum wires, aluminum rods or aluminum elongated elements and the molding composition is hardened at temperatures of 60°–120° C., hollow channels with a lining of alumina hydrate being formed in place of the aluminum wires or rods by reaction of the alkali of the alkali silicate solution and the alumina hydrate on the surface of the hollow channels is converted to γ-aluminum oxide by heating to 600°–850° C.

3. A process according to claim 2, wherein the aqueous alkali silicate solution is prepared entirely or partially by dissolving amorphous, disperse-pulverulent, aqueous silicic acid in alkali hydroxides or the aqueous solutions of the latter.

4. A process according to claim 2, wherein the aluminum wires, aluminum rods or aluminum elongated elements, are held in the mold by shaping a part of the mold wall as a perforated disk.

5. A process according to claim 2, wherein an electrode having an electrical DC voltage applied thereto, is electrically connected to the aluminum wire, rods or elongated elements during the hardening step.

6. A process according to claim 2, wherein the molding composition is poured into the mold containing a plurality of aluminum elongated elements.

7. A process for the production of an inorganic catalyst support with hollow channels contained therein having a deposit of γ-aluminum oxide on the surface of the channels, wherein an inorganic molding composition of (a) an oxide mixture with contents of amorphous SiO$_2$ and aluminum oxide and/or (b) electrostatic precipitator ash from high-temperature coal-burning power plants and/or (c) calcined ground bauxite and/or metakaolin, in amounts of 0.5–4.0 parts by weight of at least one of the components (a) through (c), per one part by weight of an alkali silicate solution with contents of 1.2 to 2.5 moles of dissolved SiO$_2$ per mole of K$_2$O or Na$_2$O as well as optionally finely divided fillers is, in fluid form, introduced into a mold, said mold containing a plurality of aluminum elongated elements; the molding composition is hardened at temperatures of 60°–120° C., hollow channels with a lining a alumina hydrate being formed in place of the aluminum elongated elements by reaction of the alkali of the alkali silicate solution; and the alumina hydrate on the surface of the hollow channels is converted to γ-aluminum oxide by heating to 600°–850° C.

8. A process according to claim 7, wherein an electrode having an electrical DC voltage applied thereto, is electrically connected to the aluminum elongated elements during the hardening step.

* * * * *